(12) United States Patent
Smith et al.

(10) Patent No.: US 10,247,076 B2
(45) Date of Patent: Apr. 2, 2019

(54) EXHAUST TREATMENT SYSTEM INCLUDING AMMONIA STORAGE CONTROL SYSTEM

(71) Applicant: GM Global Technology Operations LLC, Detroit, MI (US)

(72) Inventors: Michael A. Smith, Clarkston, MI (US); David P. Quigley, Brighton, MI (US); Sarah Funk, Canton, MI (US); Enrik Fetolli, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/481,941

(22) Filed: Apr. 7, 2017

(65) Prior Publication Data

US 2018/0291783 A1    Oct. 11, 2018

(51) Int. Cl.
| | | |
|---|---|---|
| F01N 3/00 | (2006.01) | |
| F01N 3/20 | (2006.01) | |
| F01N 3/08 | (2006.01) | |
| F01N 11/00 | (2006.01) | |

(52) U.S. Cl.
CPC ........... *F01N 3/208* (2013.01); *F01N 3/0814* (2013.01); *F01N 11/002* (2013.01)

(58) Field of Classification Search
USPC .................. 60/274, 286, 295, 297, 301, 303
See application file for complete search history.

(56) References Cited

U.S. PATENT DOCUMENTS

| | | | | |
|---|---|---|---|---|
| 9,771,846 B2* | 9/2017 | Lee | ...................... | F01N 3/0842 |
| 9,797,286 B2* | 10/2017 | Larose, Jr. | .............. | F01N 3/208 |
| 2011/0099985 A1* | 5/2011 | Yasui | ...................... | F01N 3/208 60/287 |
| 2011/0138779 A1* | 6/2011 | Neumayer | .............. | F01N 3/208 60/274 |
| 2011/0185707 A1* | 8/2011 | Upadhyay | ................. | F01N 3/18 60/274 |
| 2011/0265452 A1* | 11/2011 | Geveci | .................... | F01N 3/208 60/274 |

* cited by examiner

*Primary Examiner* — Binh Q Tran
(74) *Attorney, Agent, or Firm* — Cantor Colburn LLP (57) ABSTRACT

A vehicle includes an engine that combusts an air/fuel mixture to produce an exhaust gas stream containing oxides of nitrogen (NOx). A dosing system injects an amount of ammonia ($NH_3$) into the exhaust gas stream based on an initial $NH_3$ injection set point value. A selective catalyst reduction (SCR) device absorbs an amount of the $NH_3$ contained in the exhaust gas stream and reduces an amount of NOx. An electronic hardware controller predicts an $NH_3$ slip condition during which a portion the absorbed $NH_3$ will slip from the SCR device, and modifies the initial $NH_3$ injection set point value based on the predicted $NH_3$ slip condition. The controller further generates a modified $NH_3$ injection set point signal indicating an adjusted amount of the $NH_3$ to inject during the predicted $NH_3$ slip condition. The dosing system adjusts the amount of injected $NH_3$ based on the modified $NH_3$ injection set point signal.

20 Claims, 3 Drawing Sheets

EXHAUST TREATMENT SYSTEM INCLUDING AMMONIA STORAGE CONTROL SYSTEM

INTRODUCTION

The present disclosure relates to automotive vehicle exhaust systems, and more particularly, to automotive vehicle exhaust treatment systems.

Automotive internal combustion engines emit exhaust gas that includes carbon monoxide (CO), hydrocarbons (HC), and oxides of nitrogen (NOx). Therefore, automotive vehicles typically include exhaust treatment systems for removing particulates and reducing regulated constituents from exhaust gas produced by the engine before expelling the exhaust gas from the vehicle. Exhaust treatment systems typically include a selective catalyst reduction (SCR) device that converts NOx into diatomic nitrogen ($N_2$) and water ($H_2O$) in the presence of ammonia ($NH_3$) to reduce the level of NOx expelled from the vehicle. The $NH_3$ may be delivered in the form of urea, for example. A dosing system is installed in the exhaust treatment system to inject the $NH_3$ into the exhaust gas stream. When, however, excess $NH_3$ is injected into the exhaust gas, an amount of $NH_3$ can pass through the SCR catalyst without reacting. The non-reacted $NH_3$ that passes through the SCR catalyst is typically referred to as $NH_3$ slippage. Therefore, the exhaust treatment system typically relies on $NH_3$ target set points to control the amount of $NH_3$ to inject into the exhaust gas at a given vehicle driving condition.

SUMMARY

In at least one non-limiting embodiment, a vehicle including an exhaust system comprises an internal combustion engine configured to combust an air/fuel mixture and to generate an exhaust gas stream containing oxides of nitrogen (NOx). A dosing system is configured to inject an amount of ammonia ($NH_3$) into the exhaust gas stream based on an initial $NH_3$ injection set point value to generate a mixture of $NH_3$ and exhaust gas. A selective catalyst reduction (SCR) device is configured to absorb an amount of the $NH_3$ contained in the exhaust gas stream and to reduce an amount of NOx in the exhaust gas stream based on the absorbed NOx. An electronic hardware controller is in signal communication with the dosing system. The controller is configured to predict an $NH_3$ slip condition during which a portion the absorbed $NH_3$ will slip from the SCR device, and to modify the initial $NH_3$ injection set point value based on the predicted $NH_3$ slip condition. The controller further generates a modified $NH_3$ injection set point signal indicating an adjusted amount of the $NH_3$ to inject during the predicted $NH_3$ slip condition. The dosing system adjusts the amount of injected $NH_3$ based on the modified $NH_3$ injection set point signal to reduce the amount of $NH_3$ that slips from the SCR device when the $NH_3$ slip condition occurs.

In addition to one or more of the features described herein, or as an alternative, further embodiments include, wherein the controller converts a NOx input value indicating an amount of the NOx into a NOx flux value indicating a level of NOx flux, and predicts the $NH_3$ slip condition based on the level of NOx flux.

In addition to one or more of the features described herein, or as an alternative, further embodiments include, wherein the NOx flux value is calculated based on at least one of a NOx flux lookup table stored in memory of the controller and a position of an accelerator pedal installed on the automotive vehicle.

In addition to one or more of the features described herein, or as an alternative, further embodiments include, wherein the predicted $NH_3$ slip condition is a based on the NOx flux value with respect to a temperature of the SCR device.

In addition to one or more of the features described herein, or as an alternative, further embodiments include, wherein the controller determines the initial $NH_3$ injection set point value based on a temperature change of the SCR device and an exhaust flow rate of the exhaust gas stream.

In addition to one or more of the features described herein, or as an alternative, further embodiments include, wherein the controller generates an $NH_3$ set point correction value based on the temperature of the SCR device and the NOx flux, and applies the $NH_3$ set point correction value to the initial $NH_3$ injection set point value to generate the modified $NH_3$ injection set point value.

In addition to one or more of the features described herein, or as an alternative, further embodiments include, an exhaust flow sensor in fluid communication with the exhaust gas stream and configured to generate a flow rate signal indicating the flow rate of the exhaust gas stream, an inlet temperature sensor disposed upstream from the SCR device to generate an inlet temperature signal indicating the temperature of the SCR device, and a NOx sensor in fluid communication with the exhaust gas stream to generate a NOx signal indicating the amount of NOx.

In yet another non-limiting embodiment, an ammonia ($NH_3$) storage control system is installed in a vehicle. The $NH_3$ storage control system includes a selective catalyst reduction (SCR) device configured to absorb an amount of $NH_3$ contained in an exhaust gas stream and to reduce an amount of NOx in the exhaust gas stream based on the absorbed NOx. The $NH_3$ storage control system further comprises a $NH_3$ target set point controller, a $NH_3$ set point correction controller, and a $NH_3$ dosing controller. The $NH_3$ target set point controller is configured to determine an $NH_3$ injection target set point value that corresponds to an exhaust flow rate at a given SCR temperature. The $NH_3$ set point correction controller is configured to determine a $NH_3$ set point correction value that corresponds to a NOx flux at the given SCR temperature. The $NH_3$ dosing controller is in signal communication with the $NH_3$ target set point controller and the $NH_3$ set point correction controller, and is configured to determine an initial $NH_3$ injection set point value. The $NH_3$ dosing controller further generates a modified $NH_3$ injection set point value in response to modifying the initial $NH_3$ injection set point value using the $NH_3$ injection target set point value and the $NH_3$ set point correction value, and outputs a modified $NH_3$ injection set point signal based on the modified $NH_3$ injection set point value. The modified $NH_3$ injection set point signal controls a dosing system to adjust an amount of the $NH_3$ delivered to the SCR device.

In addition to one or more of the features described herein, or as an alternative, further embodiments include, wherein the $NH_3$ target set point controller determines the $NH_3$ injection target set point value based on a temperature of the SCR device and an exhaust flow rate of the exhaust gas stream.

In addition to one or more of the features described herein, or as an alternative, further embodiments include, wherein the $NH_3$ set point correction controller determines the NOx flux based on at least one of a measured amount of NOx in the exhaust gas stream and a modeled amount of NOx in the exhaust gas stream.

In addition to one or more of the features described herein, or as an alternative, further embodiments include, wherein the $NH_3$ target set point controller stores a NOx flux look-up table that cross-references a plurality of $NH_3$ injection set point target values with a corresponding exhaust flow rate value at a given SCR temperature, and determines the $NH_3$ injection target set point value in response to comparing a measured exhaust flow rate and a measured SCR temperature of the SCR device with the exhaust flow rate look-up table.

In addition to one or more of the features described herein, or as an alternative, further embodiments include, wherein the $NH_3$ set point correction controller stores an $NH_3$ correction look-up table that cross-references a plurality of $NH_3$ set point correction values with a corresponding NOx flux value at a given SCR temperature, and determines the $NH_3$ set point correction value in response to comparing a NOx flux value and a SCR temperature value of the SCR device with the $NH_3$ correction look-up table.

In addition to one or more of the features described herein, or as an alternative, further embodiments include, wherein the $NH_3$ target set point correction controller determines a NOx value based on at least one of the measured amount of NOx and the modeled amount of NOx, and converts the NOx value into a NOx flux value indicating the NOx flux.

In yet another non-limiting embodiment, a method of reducing ammonia ($NH_3$) slip in an exhaust treatment system of a vehicle, comprises combusting an air/fuel mixture to generate an exhaust gas stream containing oxides of nitrogen (NOx), and injecting an amount of $NH_3$ into the exhaust gas stream based on an initial $NH_3$ injection set point value to generate a mixture of $NH_3$ and exhaust gas. The method further comprises absorbing an amount of the $NH_3$ contained in the exhaust gas stream, via a selective catalyst reduction (SCR) device. The method further comprises predicting an $NH_3$ slip condition during which a portion the absorbed $NH_3$ will slip from the SCR device. The method further includes modifying the initial $NH_3$ injection set point value, based on the predicted $NH_3$ slip condition, to generate a modified $NH_3$ injection set point signal indicating an adjusted amount of the $NH_3$ to inject during the predicted $NH_3$ slip condition. The method further includes injecting an adjusted amount of the $NH_3$, based on the modified $NH_3$ injection set point signal, to reduce the amount of $NH_3$ that slips from the SCR device when the $NH_3$ slip condition occurs.

In addition to one or more of the features described herein, or as an alternative, further embodiments include, further comprising calculating a NOx input value indicating an amount of the NOx into a NOx flux value indicating a level of NOx flux, and predicting the $NH_3$ slip condition based on the level of NOx flux.

In addition to one or more of the features described herein, or as an alternative, further embodiments include, wherein the NOx flux value is calculated based on at least one of a NOx flux lookup table stored in memory of the controller and a position of an accelerator pedal installed on the automotive vehicle.

In addition to one or more of the features described herein, or as an alternative, further embodiments include, wherein the predicted $NH_3$ slip condition is based on a change in the level of NOx during a given operating temperature of the SCR device.

In addition to one or more of the features described herein, or as an alternative, further embodiments include, wherein the initial $NH_3$ injection set point value is based on a temperature change of the SCR device and an exhaust flow rate of the exhaust gas stream.

In addition to one or more of the features described herein, or as an alternative, further embodiments include, generating a $NH_3$ correction value based the predicted $NH_3$ slip condition.

In addition to one or more of the features described herein, or as an alternative, further embodiments include, wherein modifying the initial $NH_3$ injection set point value includes applying the $NH_3$ correction value to the initial $NH_3$ injection set point value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Automotive vehicles typically include a hardware control module such as, for example, an engine control unit (ECU). The ECU includes an electronic hardware controller capable of controlling the operation of one or more components of an exhaust treatment system. The ECU can also store $NH_3$ injection set point values that indicate an amount of $NH_3$ to inject into an exhaust gas stream with the goal of achieving the most efficient $NH_3$ stored on or used by the SCR device at a given vehicle operating condition to prevent $NH_3$ slippage. Variations in engine out NOx due to vehicle speed transient conditions, altitude variations, and combustion modes can cause $NH_3$ slip conditions which reduce the accuracy of the stored $NH_3$ injection set point values, and in turn reduce the NOx conversion efficiency of the SCR device. In addition, $NH_3$ storage capacity of the SCR device decreases with increasing SCR catalyst temperatures. Therefore, as the SCR catalyst temperature increases, it is necessary to adjust the $NH_3$ injection set point to prevent $NH_3$ slippage.

Conventional exhaust treatment systems determine $NH_3$ injection set points based exclusively on a temperature change of the SCR device. Certain driving conditions such as vehicle accelerations and other high-speed transient events, for example, cause sudden increases in the SCR catalyst temperature along with changes in NOx flux (i.e., the NOx flow rate measured in grams per second) passing through the SCR device. The changes in SCR catalyst temperature and NOx flux can create an $NH_3$ slip condition. However, the $NH_3$ slip condition occurs before the time at which SCR catalyst temperature change is detected. Because conventional exhaust treatment systems determine $NH_3$ injection set points based exclusively on SCR catalyst temperature changes, conventional exhaust treatment do not deliver the proper dosage of $NH_3$ to sufficiently reduce $NH_3$ slippage.

Various non-limiting embodiments described herein provide a vehicle having an exhaust treatment system configured to dynamically adjust $NH_3$ injection set points based not only on the temperature of the SCR catalyst, but also on both exhaust flow rate and NOx flux. An engine control unit (ECU) is provided which determines the NOx flux based an amount of NOx in the exhaust gas stream, and utilizes the NOx flux to predict temperature increases in SCR catalyst. The balance between the predicted SCR catalyst temperature and the NOx flux can be utilized to predict a forthcoming $NH_3$ slip condition. In this manner, the exhaust treatment system can deliver the proper dosage of $NH_3$, based on the adjusted $NH_3$ injection set points, to match NOx slip conditions and reduce $NH_3$ slippage.

The ECU included in the exhaust treatment system according to one or more non-limiting embodiments is capable of dynamically selecting an $NH_3$ injection set points based on the balance of the predicted SCR catalyst temperature rise with respect to the predicted NOx flux. That is, the ECU included in the exhaust treatment system can predict SCR catalyst temperature increases and NOx flux increases at given driving conditions, and in turn can dynamically adjust $NH_3$ injection set points to compensate for a predicted forthcoming $NH_3$ slip condition. In this manner, $NH_3$ injection times can be advanced so that $NH_3$ delivery is in time to match transient driving conditions and $NH_3$ slip conditions to maintain emissions control while minimizing $NH_3$ slip.

Figure 1:
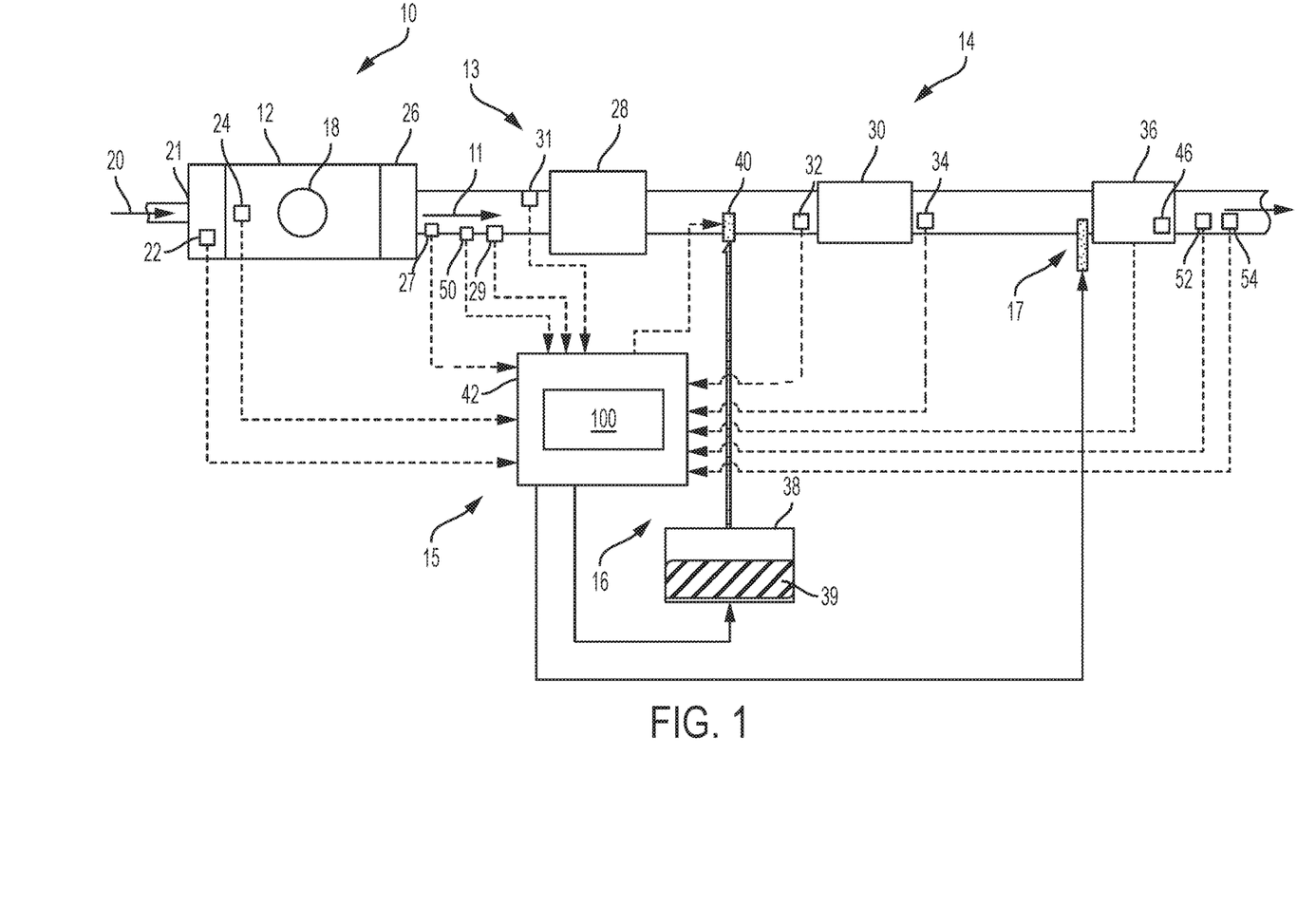
FIG. 1 is a functional block diagram of an engine system including an $NH_3$ storage control system according to a non-limiting embodiment.

Referring now to FIG. 1, an engine system 10 is schematically illustrated. The engine system 10 includes an internal combustion engine 12, an exhaust system 13, and an $NH_3$ storage control system 15. The exhaust system 13 further includes an exhaust treatment system 14 and a dosing system 16.

The engine 12 includes one or more cylinders 18, an intake manifold 21, a mass air flow (MAF) sensor 22 and an engine speed sensor 24. Air 20 flows into the engine 12 through the intake manifold 21 and is monitored by the MAF sensor 22. Although a MAF sensor 22 is described herein, other means for determining the MAF can be used including, for example, a MAF model stored in an electronic controller such as an engine control module (ECM) may be utilized. The air 20 is directed into the cylinders 18 and is combusted with fuel to drive pistons (not shown). Although a single cylinder 18 is illustrated in FIG. 1, it can be appreciated that the engine 12 may include additional cylinders 18. For example, the engine system 10 can implement an engine 12 having 2, 3, 4, 5, 6, 8, 10, 12 and 16 cylinders.

Exhaust gas 11 is produced inside the cylinder 18 as a result of combusting air and fuel. The exhaust treatment system 14 treats the exhaust gas 11 delivered, via an exhaust manifold 26, before it is released to the atmosphere. The exhaust treatment system 14 includes an upstream oxidation catalyst (OC) device 28 such as, for example, a selective catalyst reduction (SCR) device 30, and a particulate filter (PF) device 36 such as, for example, a diesel PF (DPF) device. As can be appreciated, the exhaust treatment system 14 of the present disclosure may include other exhaust treatment devices (not shown), or other configurations of exhaust treatment devices.

The OC device 28 can be one of various flow-through, oxidation catalyst devices known in the art. The OC device 28 has an OC substrate (not shown) which may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC device 28 is useful in treating unburned gaseous and non-volatile HC and CO, which are oxidized to form carbon dioxide and water.

The SCR device 30 may be disposed downstream of the OC device 28, and is configured to reduce NOx constituents in the exhaust gas 11. In various embodiments, the SCR device 30 can be constructed using a flow-through monolith SCR substrate (not shown), which may include an SCR catalyst composition (e.g., a SCR washcoat) applied thereon. The SCR catalyst utilizes $NH_3$ to assist in reducing the level of NOx in the exhaust gas stream. More specifically, the SCR catalyst composition can contain a zeolite and one or more base metal components such as iron (Fe), cobalt (Co), copper (Cu) or vanadium (V) which can operate efficiently to convert NOx constituents in the presence of $NH_3$. The $NH_3$ is delivered to the exhaust gas stream 11 using the dosing system, and may be delivered in the form of a gas, a liquid, or an aqueous urea solution.

The PF device 36 may be disposed downstream from the SCR device 30, and filters the exhaust gas 11 of carbon and other particulate matter (e.g. soot). According to at least one exemplary embodiment, the PF device 36 may be constructed using a ceramic wall flow monolith substrate (not shown) that traps particulate matter (e.g., soot) as the exhaust gas 11 travels therethrough. It is appreciated that the ceramic wall flow monolith substrate is merely exemplary in nature and that the PF device 36 may include other filter devices such as wound or packed fiber filters, open cell foams, sintered metal fibers, etc. To enhance the performance of the PF device 36, a catalytic material may be applied to the substrate. The PF catalyst promotes oxidation of hydrocarbons, carbon monoxide (CO), soot and particulate matter trapped in the PF substrate under conditions that cause exothermic reactions occurring at the PF substrate. Accordingly, a catalyzed PF device may be subject to increased temperatures compared to an uncatalyzed PF.

The exhaust treatment system 13 can also include a PF regeneration system 17. The PF regeneration system performs a regeneration process that cleans the PF device 36 by burning off the particulate matter (e.g., soot) trapped in the PF substrate. Such a system is known, and as a result, will not be described further.

The exhaust treatment system 14 further includes various sensors configured to monitor conditions therein. For instance, the exhaust treatment system 14 includes a pressure sensor 27, an exhaust gas flow rate sensor 29, an exhaust temperature sensor 31, an SCR inlet temperature sensor 32, and an SCR outlet temperature sensor 34.

The pressure sensor 27 determines a current ambient atmospheric pressure realized by the vehicle. The exhaust gas flow rate sensor 29 may be positioned between the engine 12 and the upstream OC device 28, and can measure the flow rate of the exhaust gas 11 entering the exhaust treatment system 14. The exhaust temperature sensor 31 may be positioned between the engine 12 and the upstream OC device 28, and measures the temperature of the exhaust gas 11 entering the exhaust treatment system 14. The SCR inlet temperature sensor 32 is located upstream from the SCR device 30 to monitor the temperature at the inlet of the SCR device 30. The SCR outlet temperature sensor 34 is located downstream from the SCR device 30 to monitor the temperature at the outlet of the SCR device 30. Although the exhaust treatment system 14 is illustrated as including the SCR inlet temperature sensor 32 and the SCR outlet temperature sensor 34 arranged outside the SCR device 30, the temperature sensors 32 and 34 can be located inside the SCR device 30 to monitor the temperature of the exhaust at the inlet and outlet of the SCR device 30.

The dosing system 16 includes an $NH_3$ storage unit 38 and a dosing injector 40. The $NH_3$ storage unit 38 stores an $NH_3$ supply 39. The dosing injector 40 injects amount of $NH_3$ 39 into the exhaust gas stream 11. The injected amount of $NH_3$ 39 mixes with the exhaust gas stream 11 and works as a catalyst in concert with the SCR catalyst. For instance, the mixture of exhaust gas 11 and $NH_3$ 39 chemically reacts with the SCR catalyst to convert NOx into diatomic nitrogen (N2) and water (H2O), thereby reducing the level of NOx emissions in the exhaust gas stream 11.

A temperature sensor 46 generates a particulate filter temperature corresponding to a measured temperature of the PF device 36. The temperature sensor 46 may be disposed on or within the PF device 36. The temperature sensor 46 may also be located upstream or downstream from the PF device 36.

Other sensors in the exhaust system 13 may include an upstream NOx sensor 50 that generates a NOx signal based on a concentration of NOx present in the exhaust system 13. A downstream NOx sensor 52 may be positioned downstream from the PF device 36 to measure a concentration of NOx leaving the PF device 36. In addition, an $NH_3$ sensor 54 generates a signal corresponding to the amount of ammonia within the treated exhaust gas 11. The $NH_3$ sensor 54 is optional, but can be used to simplify the control system 15 due to the sensor's ability to directly measure the amount of $NH_3$ in the exhaust gas stream, instead of relying on estimated values of the amount of $NH_3$. It should be appreciated that the locations of the sensors 50, 52 and 54 are not limited to the locations illustrated in FIG. 1.

The $NH_3$ storage control system 15 includes a control module 42 such as an ECU, for example, which may also regulate and control various operations including, but not limited to, operation and fuel injection timing of the engine 12. For instance, the control module 42 can be constructed as an electronic hardware controller that includes memory and a processor configured to execute various algorithms and models that assist in controlling operation of the exhaust treatment system 14 such as, for example, a pressure-based soot model that controls regeneration timing of the PF device 36 and also the amount of soot to burn off based on a given driving condition.

The control module 42 includes a SCR optimization module 100 that dynamically adjusts or applies $NH_3$ injection set points to minimize $NH_3$ slip from the SCR device 30. In at least one embodiment, the optimization module 100 predicts SCR temperature increases and/or NOx flux increases at given driving conditions, and can dynamically apply an $NH_3$ injection set point that compensates for these predicted increases. In at least one embodiment, the control module 42 first predicts an increase in NOx flux flowing through the exhaust system 14. This predicted NOx flux increase is then used to predict the $NH_3$ slip condition. In at least one embodiment, the predicted $NH_3$ slip condition is determined by predicting NOx flux as a function of the temperature of the SCR device 30. In this manner, $NH_3$ dosing times can be advanced so that the $NH_3$ 39 is injected in time to match transient driving conditions and high NOx flux conditions to improve NOx conversion while minimizing $NH_3$ slip.

Figure 2:
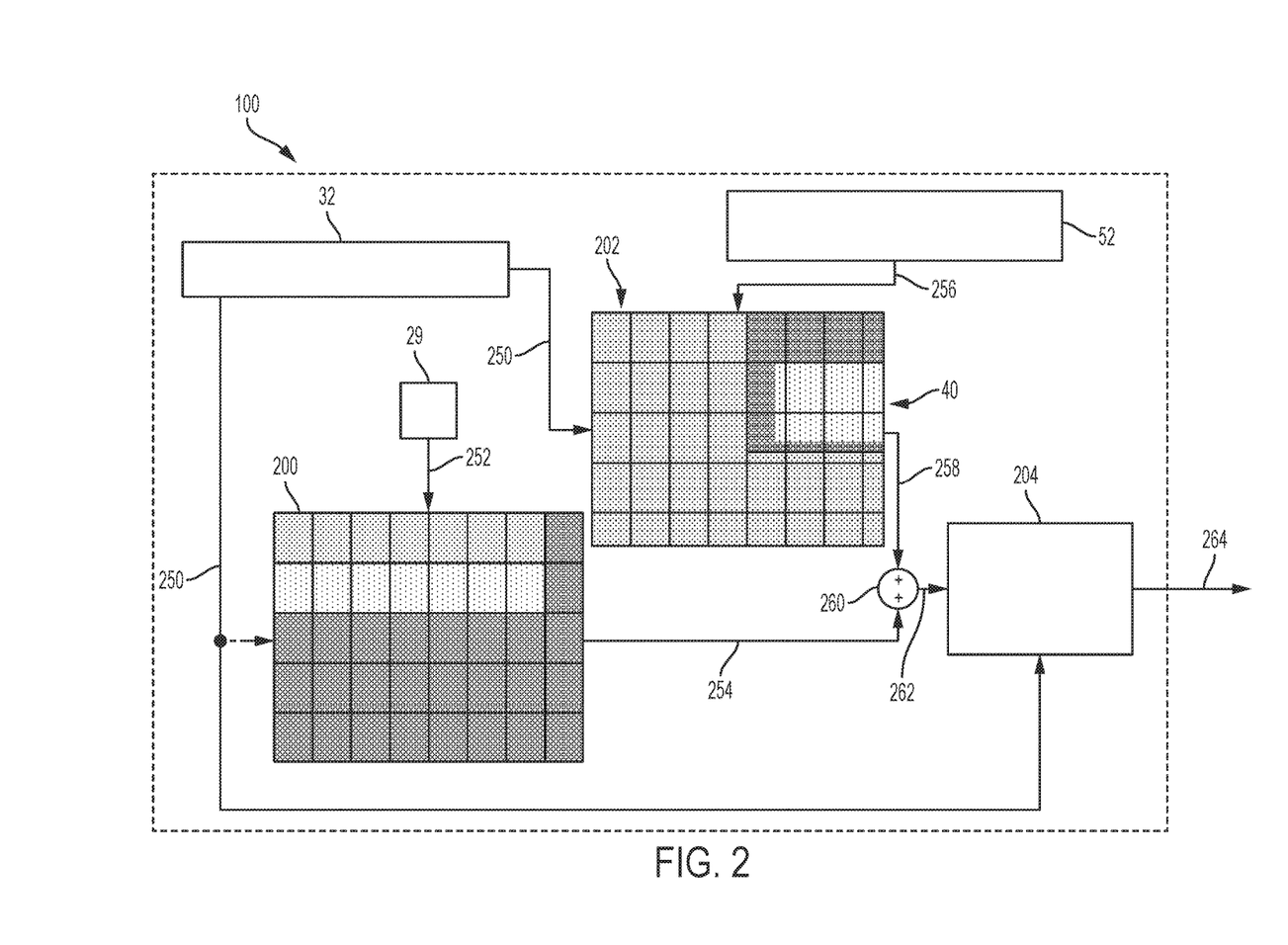
FIG. 2 is a block diagram of an SCR optimization module included in an $NH_3$ storage control system according to a non-limiting embodiment.

Turning now to FIG. 2, the SCR optimization module 100 is illustrated, according to a non-limiting embodiment. The SCR optimization module 100 includes an $NH_3$ target set point controller 200, an $NH_3$ set point correction controller 202, and an $NH_3$ dosing controller 204. Any one of the $NH_3$ target set point controller 200, the $NH_3$ set point correction controller 202, and the $NH_3$ dosing controller 204 can be constructed as an electronic hardware controller that includes memory and a processor configured to execute algorithms and computer-readable program instructions stored in the memory.

The $NH_3$ target set point controller 200 is in signal communication with the SCR inlet temperature sensor 32 and the exhaust gas flow rate sensor 29. In at least one embodiment, the $NH_3$ target set point controller 200 stores an exhaust flow rate LUT. The exhaust flow rate LUT stores a first plurality of $NH_3$ injection set point target values to compensate for imprecise $NH_3$ injection set point values that can result due to sudden variations in exhaust flow rate and SCR catalyst temperatures. Each of the $NH_3$ injection set point target values corresponds to a given exhaust flow rate at a given SCR catalyst temperature.

The $NH_3$ injection set point target values can range from high set point target values (indicated by light shading) to low values (indicated by medium shading), to even "zero value" set point target values (indicated by dark shading). High set point target values are utilized during optimal operating temperatures of the SCR catalyst which allows for the least amount of $NH_3$ slip from the SCR device 30. Thus, a high set point target value indicates delivery of an increased amount of $NH_3$ 39 into the exhaust gas stream 11, while the low set point target values or zero values indicate delivery of a lower amount of $NH_3$ into the exhaust gas stream 11.

The $NH_3$ target set point controller 200 outputs an $NH_3$ set point correction signal 254 indicating an applicable $NH_3$ injection target set point value. The $NH_3$ first set point correction signal 254 can be based on the measured SCR inlet temperature value 250 output from the SCR inlet temperature sensor 32 and the measured exhaust flow rate 252 output from the exhaust gas flow rate sensor 29. The NOx flux may also be determined via a pedal position indicated by a pedal position sensor (not shown) coupled to an accelerator pedal assembly (not shown). Thus, the position of the accelerator pedal output from the pedal position sensor can be compared to a NOx flux LUT to obtain an estimated NOx flux.

The $NH_3$ set point correction controller 202 is in signal communication with the SCR inlet temperature sensor 32 and the NOx out sensor 52. The $NH_3$ set point correction controller 202 receives a NOx input value indicating an amount of NOx in parts per million (PPM), and converts the NOx input value into a NOx flux value indicating an amount of NOx (grams) that travels across a given distance over a given time period (seconds). Thus, the NOx flux value indicates the NOx flux (g/s) flowing through the exhaust system.

The $NH_3$ set point correction controller 202 also stores a NOx flux LUT that stores a plurality $NH_3$ set point correction values. The $NH_3$ set point correction values compensate for imprecise $NH_3$ injection set point values that can result due to sudden variations in exhaust flow rate and SCR catalyst temperatures. Each of the $NH_3$ set point correction values corresponds to a given NOx flux at a given SCR temperature.

The $NH_3$ set point correction values can range from high set point correction values (indicated by light shading) to low values (indicated by medium shading), to even "zero value" set point target values (indicated by dark shading). High set point correction values are utilized to provide larger corrections to the $NH_3$ injection target set point value indicated by the first $NH_3$ set point correction signal 254, which in turn reduces the overall $NH_3$ slip from the SCR device 30 compared to conventional exhaust treatment systems. Low set point correction values or zero values indicate a lesser need to correct the $NH_3$ injection target set point value indicated by the first $NH_3$ set point correction signal 254.

Accordingly, the $NH_3$ set point correction controller 202 outputs a second $NH_3$ set point correction signal 258 indicating an applicable $NH_3$ set point correction value based on the measured SCR inlet temperature value 250 output from the SCR inlet temperature sensor 32 and the NOx input value 256. The NOx input value 256 can be based on the output from the downstream NOx sensor 52 and/or a NOx flux model stored in memory of the SCR optimization module 100.

Accordingly, a determined amount of NOx (ppm) indicated by the NOx input value 256 can be converted into an estimated NOx flux value (g/s) present during a given SCR catalyst temperature. This NOx flux value can used to detect changes in NOx flux and, in turn, predict an $NH_3$ slip condition. In at least one embodiment, the predicted slip condition can also be determined based on a change in the level of NOx flux over a predetermined time period. For example, a first NOx flux value can be measured at a first time period (T1) and a second NOx flux value can be measured at a second time period (T2). When the difference between the first NOx flux value and the second flux value exceeds a NOx flux threshold, the controller predicts that an $NH_3$ slip condition will occur.

Still referring to FIG. 2, a summer 260 is in signal communication with the $NH_3$ dosing controller 204. The summer 260 adds together the first $NH_3$ set point correction signal 254 and the second $NH_3$ set point correction signal 258 to generate a modified $NH_3$ set point correction signal 262. This modified $NH_3$ set point correction signal 262 is delivered to the $NH_3$ dosing controller 204. Although a summer 260 is employed, other means for modifying the initial $NH_3$ target value can be used including, for example, a multiplier that multiplies first $NH_3$ set point correction signal 254 and the second $NH_3$ set point correction signal 258.

The $NH_3$ dosing controller 204 is in signal communication with the dosing system 16, and determines an initial $NH_3$ injection set point value. In addition, the $NH_3$ dosing controller 204 modifies the initial $NH_3$ injection set point value, based on the modified $NH_3$ set point correction signal 262, to generate a modified $NH_3$ injection set point value. The modified $NH_3$ injection set point value is utilized to generate a modified $NH_3$ injection set point signal 264, which commands the dosing system 16 to inject the corrected amount of the $NH_3$ 39 into the exhaust gas stream 11 to match a predicted $NH_3$ slip condition.

As described herein, the SCR optimization module 100 can predict an $NH_3$ slip condition such as, for example, a sudden high-speed transient condition (e.g., vehicle acceleration), and the dosing system 16 injects the proper amount of $NH_3$ 39 in time to compensate for $NH_3$ slippage caused by an $NH_3$ slip condition. Accordingly, $NH_3$ slippage that occurs in conventional exhaust treatment systems during $NH_3$ slip conditions is reduced.

Figure 3:
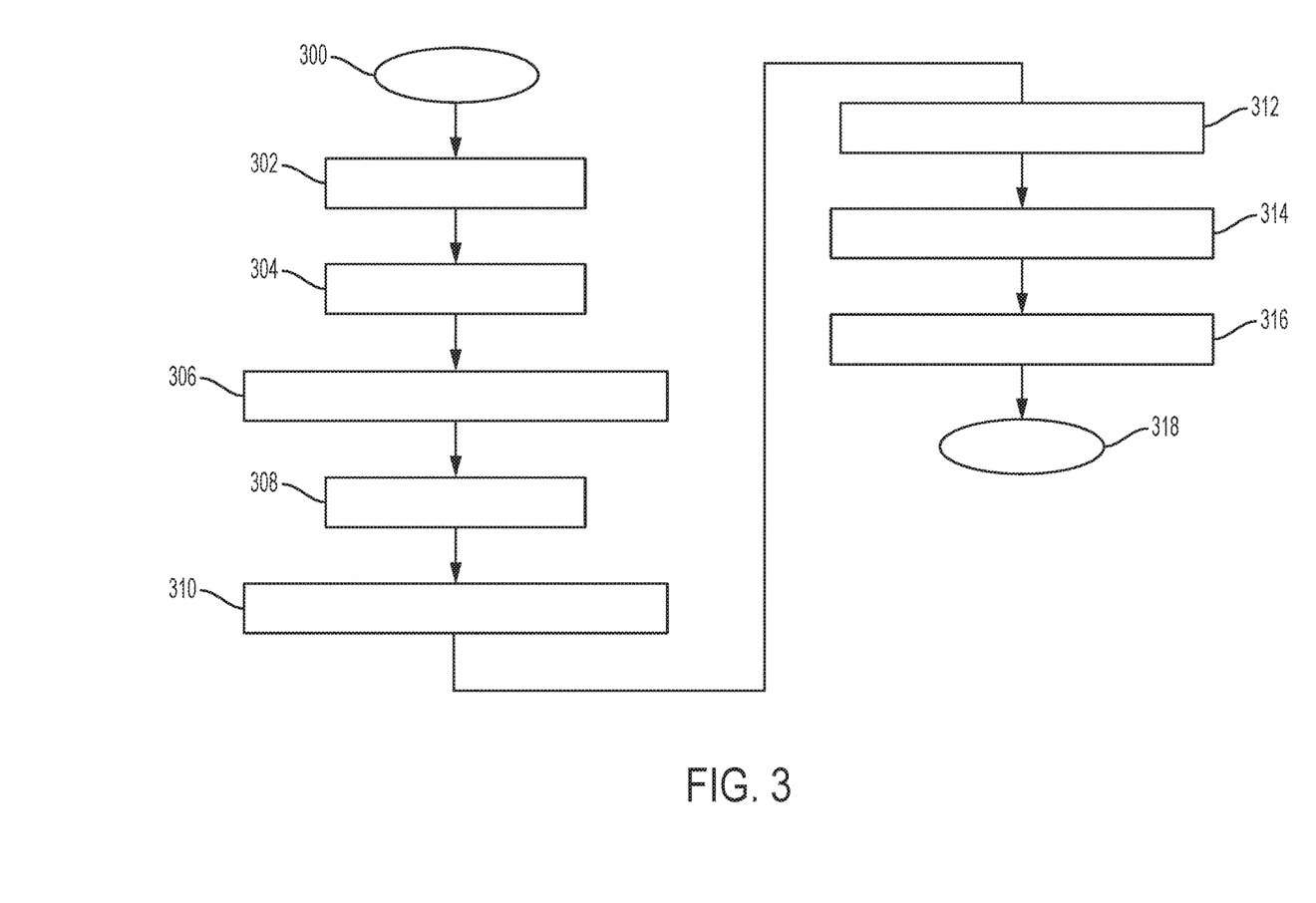
FIG. 3 is a flow diagram illustrating a method of reducing $NH_3$ slip in an exhaust treatment system of an automotive vehicle according to a non-limiting embodiment.

Turning now to FIG. 3, a flow diagram illustrates a method of reducing $NH_3$ slip in an exhaust treatment system of an automotive vehicle according to a non-limiting embodiment. The method begins at operation 300, and at operation 302, a temperature of the SCR device 30 is determined. The SCR temperature can be determined, for example, via the SCR inlet temperature sensor 32. The SCR temperature can also be based on a temperature differential between the inlet of the SCR device and the outlet of the SCR device 30. At operation 304, the exhaust flow rate of the exhaust gas 11 flowing through the exhaust system 13 is determined. The exhaust flow rate can be determined, for example, via an exhaust gas flow rate sensor 29.

At operation 306, an initial $NH_3$ target value is determined based on the SCR inlet temperature and the exhaust flow rate. At operation 308, an amount of NOx (ppm) existing in the exhaust gas stream is determined. The amount of NOx can be determined using a NOx sensor or a NOx model that indicates an amount of NOx as a function of exhaust gas temperature or accelerator pedal position. At operation 310, the determined amount of NOx is converted into NOx flux flowing through the exhaust system 13. At operation 312, the $NH_3$ correction value is applied to the initial $NH_3$ target set point to determine a modified $NH_3$ correction value. At operation 314, a modified $NH_3$ injection set point signal is generated indicating the modified $NH_3$ correction value. At operation 316, an amount $NH_3$ is injected into the exhaust gas stream according to the modified $NH_3$ injection set point signal, and the method ends at operation 318.

As described herein, unlike conventional exhaust treatment systems which determine $NH_3$ injection set points based solely on a temperature changes of a SCR device, at least one embodiment of the disclosure provides a SCR optimization module 100 which dynamically selects or applies a SCR set point based on both a predicted increase of the SCR temperature and a NOx flux under given driving conditions. In this manner, the exhaust treatment system 14 avoids inefficient $NH_3$ loading caused by time lapses that exist from the time an $NH_3$ slip condition occurs and the selection of a modified $NH_3$ injection set point.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

While the various non-limiting embodiments have been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof. Therefore, it is intended that the claims not be limited to the particular embodiments disclosed.

What is claimed is:

1. A vehicle including an exhaust system, the vehicle comprising:
   an internal combustion engine configured to combust an air/fuel mixture and to generate an exhaust gas stream containing oxides of nitrogen (NOx);
   a dosing system configured to inject an amount of ammonia ($NH_3$) into the exhaust gas stream based on an initial $NH_3$ injection set point value to generate a mixture of $NH_3$ and exhaust gas;
   a selective catalyst reduction (SCR) device configured to absorb an amount of the $NH_3$ contained in the exhaust gas stream and to reduce an amount of NOx in the exhaust gas stream based on the absorbed NOx;
   an electronic hardware controller in signal communication with the dosing system, the controller configured to predict an $NH_3$ slip condition during which a portion the absorbed $NH_3$ will slip from the SCR device, and to modify the initial $NH_3$ injection set point value based on the predicted $NH_3$ slip condition,
   wherein the controller generates a modified $NH_3$ injection set point signal indicating an adjusted amount of the $NH_3$ to inject into the exhaust gas stream during the predicted $NH_3$ slip condition, and
   wherein the dosing system adjusts the amount of injected $NH_3$ based on the modified $NH_3$ injection set point signal so as to reduce the amount of $NH_3$ that slips from the SCR device when the $NH_3$ slip condition occurs.

2. The vehicle of claim 1, wherein the controller converts a NOx input value indicating an amount of the NOx into a NOx flux value indicating a level of NOx flux, and predicts the $NH_3$ slip condition based on the level of NOx flux.

3. The vehicle of claim 2, wherein the NOx flux value is calculated based on at least one of a NOx flux lookup table stored in memory of the controller and a position of an accelerator pedal installed on the automotive vehicle.

4. The vehicle of claim 2, wherein the predicted $NH_3$ slip condition is a based on the NOx flux value with respect to a temperature of the SCR device.

5. The vehicle of claim 2, wherein the controller determines the initial $NH_3$ injection set point value based on a temperature change of the SCR device and an exhaust flow rate of the exhaust gas stream.

6. The vehicle of claim 4, wherein the controller generates an $NH_3$ set point correction value based on the temperature of the SCR device and the NOx flux, and applies the $NH_3$ set point correction value to the initial $NH_3$ injection set point value to generate the modified $NH_3$ injection set point value.

7. The vehicle of claim 6, further comprising:
   an exhaust flow sensor in fluid communication with the exhaust gas stream and configured to generate a flow rate signal indicating the flow rate of the exhaust gas stream;
   an inlet temperature sensor disposed upstream from the SCR device to generate an inlet temperature signal indicating the temperature of the SCR device; and
   a NOx sensor in fluid communication with the exhaust gas stream to generate a NOx signal indicating the amount of NOx.

8. An ammonia ($NH_3$) storage control system installed in a vehicle, the $NH_3$ storage control system comprising:
   a selective catalyst reduction (SCR) device configured to absorb an amount of $NH_3$ contained in an exhaust gas stream and to reduce an amount of NOx in the exhaust gas stream based on the absorbed NOx;
   an $NH_3$ target set point controller configured to determine an $NH_3$ injection target set point value that corresponds to an exhaust flow rate at a given SCR temperature;
   an $NH_3$ set point correction controller configured to determine a $NH_3$ set point correction value that corresponds to a NOx flux at the given SCR temperature; and
   an $NH_3$ dosing controller in signal communication with the $NH_3$ target set point controller and the $NH_3$ set point correction controller, the $NH_3$ dosing controller configured to determine an initial $NH_3$ injection set point value, to generate a modified $NH_3$ injection set point value in response to modifying the initial $NH_3$ injection set point value using the $NH_3$ injection target set point value and the $NH_3$ set point correction value, and to output a modified $NH_3$ injection set point signal based on the modified $NH_3$ injection set point value, the modified $NH_3$ injection set point signal configured to control a dosing system to adjust an amount of the $NH_3$ delivered to the SCR device.

9. The $NH_3$ storage control system of claim 8, wherein the $NH_3$ target set point controller determines the $NH_3$ injection target set point value based on a temperature of the SCR device and an exhaust flow rate of the exhaust gas stream.

10. The $NH_3$ storage control system of claim 9, wherein the $NH_3$ set point correction controller determines the NOx flux based on at least one of a measured amount of NOx in the exhaust gas stream and a modeled amount of NOx in the exhaust gas stream.

11. The $NH_3$ storage control system of claim 10, wherein the $NH_3$ target set point controller stores a NOx flux look-up table that cross-references a plurality of $NH_3$ injection set point target values with a corresponding exhaust flow rate value at a given SCR temperature, and determines the $NH_3$ injection target set point value in response to comparing a measured exhaust flow rate and a measured SCR temperature of the SCR device with the exhaust flow rate look-up table.

12. The $NH_3$ storage control system of claim 10, wherein the $NH_3$ set point correction controller stores an $NH_3$ correction look-up table that cross-references a plurality of $NH_3$ set point correction values with a corresponding NOx flux value at a given SCR temperature, and determines the $NH_3$ set point correction value in response to comparing a NOx flux value and a SCR temperature value of the SCR device with the $NH_3$ correction look-up table.

13. The $NH_3$ storage control system of claim 12, wherein the $NH_3$ target set point correction controller determines a NOx value based on at least one of the measured amount of NOx and the modeled amount of NOx, and converts the NOx value into a NOx flux value indicating the NOx flux.

14. A method of reducing ammonia ($NH_3$) slip in an exhaust treatment system of a vehicle, the method comprising:
   combusting an air/fuel mixture to generate an exhaust gas stream containing oxides of nitrogen (NOx);
   injecting an amount of $NH_3$ into the exhaust gas stream based on an initial $NH_3$ injection set point value to generate a mixture of $NH_3$ and exhaust gas;
   absorbing an amount of the $NH_3$ contained in the exhaust gas stream, via a selective catalyst reduction (SCR) device;
   predicting an $NH_3$ slip condition during which a portion the absorbed $NH_3$ will slip from the SCR device;
   modifying the initial $NH_3$ injection set point value, based on the predicted $NH_3$ slip condition, to generate a modified $NH_3$ injection set point signal indicating an adjusted amount of the $NH_3$ to inject during the predicted $NH_3$ slip condition, and injecting an adjusted amount of the $NH_3$, based on the modified $NH_3$ injection set point signal, to reduce the amount of $NH_3$ that slips from the SCR device when the $NH_3$ slip condition occurs.

15. The method of claim 14, further comprising converting a NOx input value indicating an amount of the NOx into a NOx flux value indicating a level of NOx flux, and predicting the $NH_3$ slip condition based on the level of NOx flux.

16. The method of claim 15, wherein the NOx flux value is calculated based on at least one of a NOx flux lookup table stored in memory of the controller and a position of an accelerator pedal installed on the automotive vehicle.

17. The method of claim 15, wherein the predicted $NH_3$ slip condition is based on a change in the level of NOx flux during a given operating temperature of the SCR device.

18. The method of claim 14, wherein the initial $NH_3$ injection set point value is based on a temperature change of the SCR device and an exhaust flow rate of the exhaust gas stream.

19. The method of claim 17, further comprising generating a $NH_3$ correction value based the predicted $NH_3$ slip condition.

20. The method of claim 19, wherein modifying the initial $NH_3$ injection set point value includes applying the $NH_3$ correction value to the initial $NH_3$ injection set point value.

* * * * *